Dec. 29, 1953   G. SLAYTER ET AL   2,664,374
PROCESS FOR FABRICATING STRANDS, CORDS, TUBES, AND THE LIKE
Filed Sept. 14, 1951   5 Sheets-Sheet 1
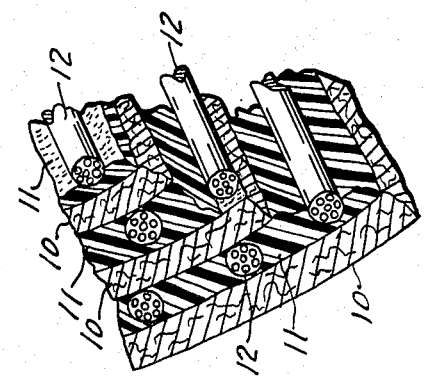
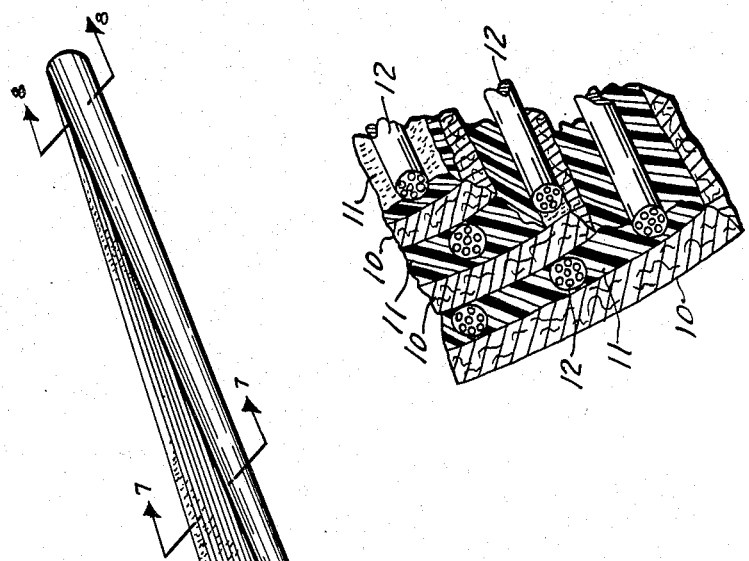
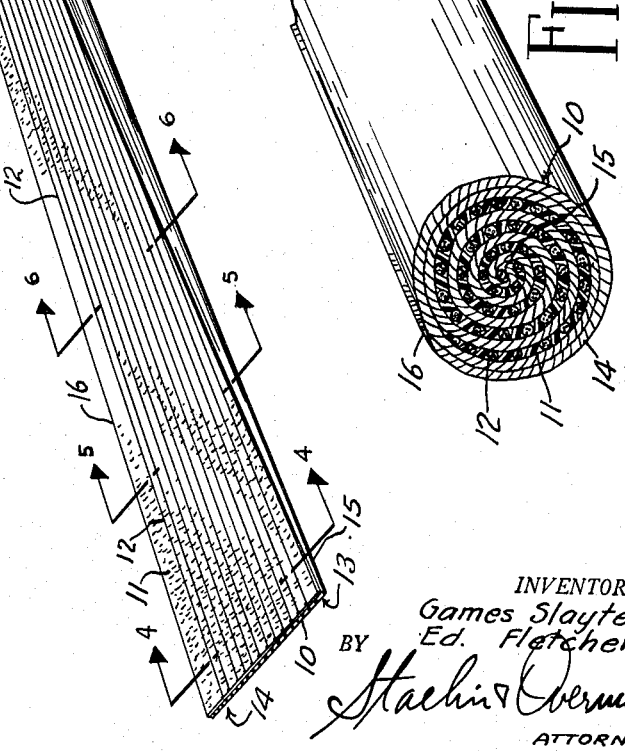
INVENTORS
Games Slayter
Ed. Fletcher
BY
ATTORNEYS

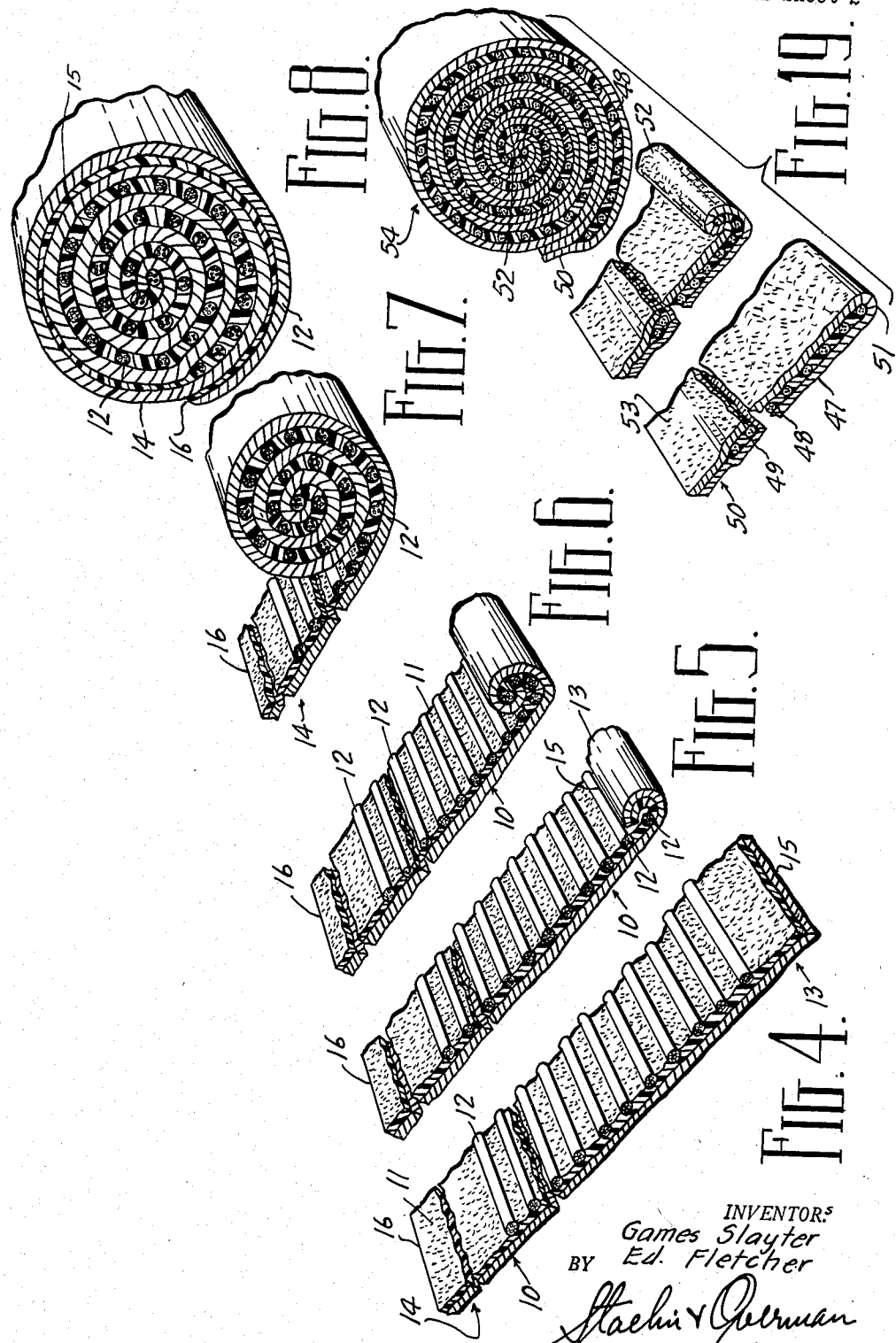

Dec. 29, 1953    G. SLAYTER ET AL    2,664,374
PROCESS FOR FABRICATING STRANDS, CORDS, TUBES, AND THE LIKE
Filed Sept. 14, 1951    5 Sheets-Sheet 3
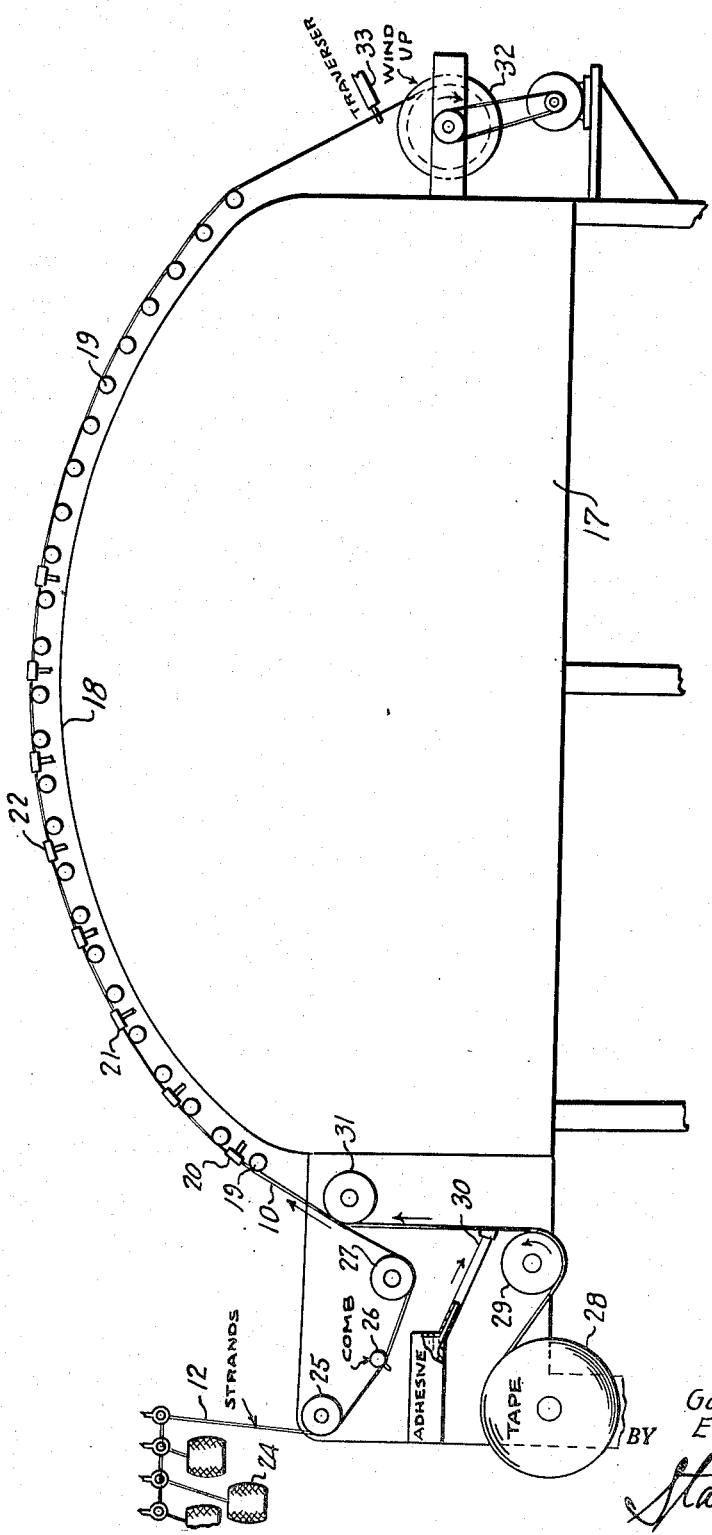
INVENTORS.
Games Slayter
Ed Fletcher
BY
Staelin & Overman
ATTORNEYS Dec. 29, 1953  G. SLAYTER ET AL  2,664,374
PROCESS FOR FABRICATING STRANDS, CORDS, TUBES, AND THE LIKE
Filed Sept. 14, 1951  5 Sheets-Sheet 4
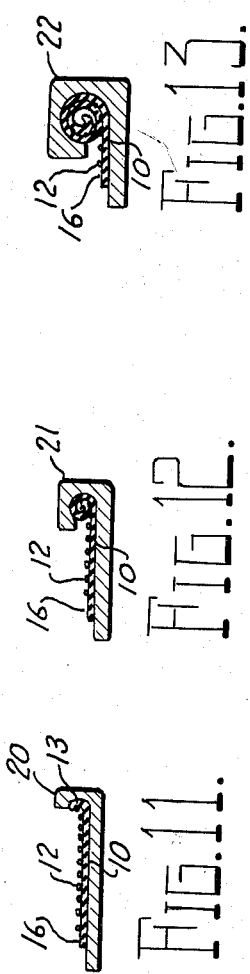
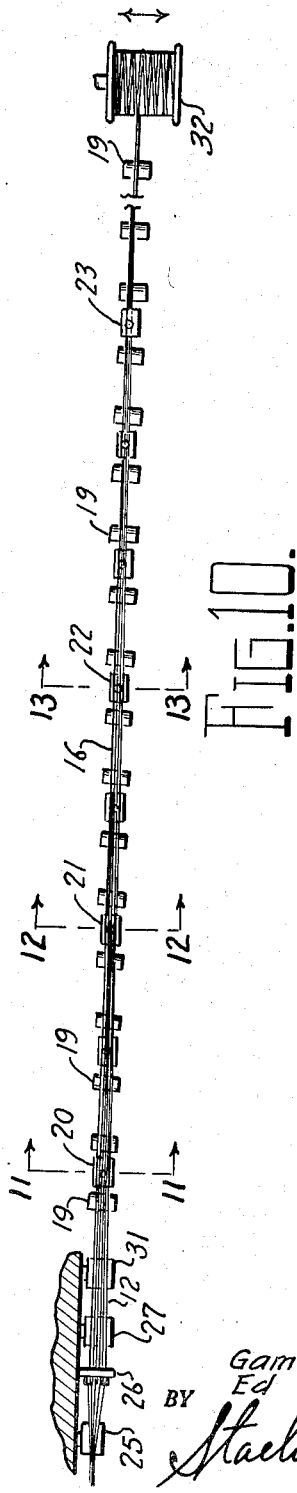
INVENTORS
Games Slayter
Ed Fletcher
BY
ATTORNEYS Dec. 29, 1953   G. SLAYTER ET AL   2,664,374
PROCESS FOR FABRICATING STRANDS, CORDS, TUBES, AND THE LIKE
Filed Sept. 14, 1951   5 Sheets-Sheet 5
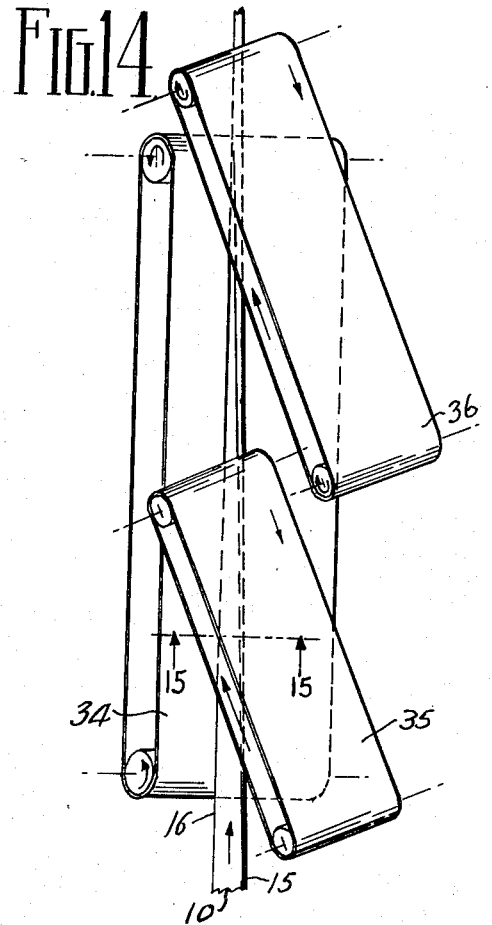
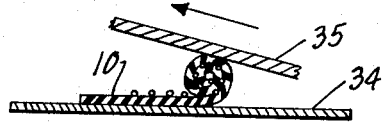
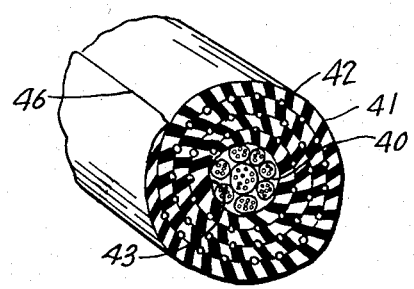
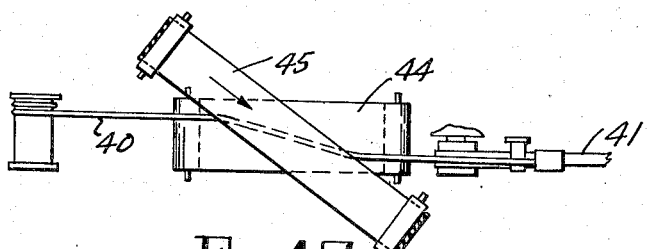
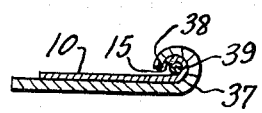
INVENTORS
Games Slayter
Ed Fletcher
BY
*Staelin & Overman*
ATTORNEYS Patented Dec. 29, 1953

2,664,374

UNITED STATES PATENT OFFICE 2,664,374

PROCESS FOR FABRICATING STRANDS, CORDS, TUBES, AND THE LIKE

Games Slayter and Ed Fletcher, Newark, Ohio, assignors to Owens-Corning Fiberglas Corporation, Toledo, Ohio, a corporation of Delaware Application September 14, 1951, Serial No. 246,686

17 Claims. (Cl. 154—91)

This invention relates to a process for the fabrication of strands, cords, tubes and the like and for the fabrication of improved products similar thereto and falling within that general classification such as insulating material for electric conducting wires, protective coatings and strengthening materials for cables, filamentary or strand materials, twines, such as baler and binder twines, flexible tubings, raffias, canes, rods, lightweight shafting, generally wire-like articles such as materials for screens and fences and many other similar, elongated, generally circular cross-sectioned articles for a plurality of uses.

The invention consists in the process for the fabrication of articles broadly disclosed and claimed in the concurrently filed copending application of Games Slayter Serial No. 246,685, filed September 14, 1951, entitled "Strands, Cords, Tubes and the Like," which related application is directed toward the products or articles themselves.

As is fully set forth in the related application, the articles constructed according to the process of the instant application consist in general of narrow strips of sheet materials rolled transversely upon themselves to build up generally helical layers that are adhered to each other and the distinguishing characteristics of the articles are, first, that the outermost edge of the strip of material extends along a line generally parallel to the axis of the finished material and, second, that the material is continuously produced in such form.

The continuous production in lengths determined only by practicability of packing and handling of such articles is the principal object of the instant invention and it comprises a process for such production in which a strip of sheet material continuously and progressively is rolled laterally to its major continuous dimension by being moved longitudinally through a "fabricating dimension" and at the same time and while moving through this dimension, having one of its edges rolled in upon itself so that the article is increased in diameter by lateral rolling, with the other of its edges, i. e., that edge which is outermost in the finished article, continuing to move only longitudinally along a straight line.

As is more full explained in the companion application of Games Slayter Serial No. 246,685 this construction provides for the almost full employment of the tensile strength of the sheet material and, in particular, of longitudinally parallel reinforcing fibers or strands, such as strands of glass fibers, that may be continuously laid upon the strip of sheet material as it progresses longitudinally and that during and after the rolling process are, for the major part, either untwisted or but slightly twisted, the fibers and strands thus lying generally parallel to each other and generally parallel to the axis of the finished article. This relationship and the process of fabrication disclosed herein result in spacing the reinforcing strands from each other thereby eliminating self-abrasion which is detrimental, particularly in the use of glass fiber reinforcing strands, and also placing each of the strands almost entirely in tension so that it contributes almost its entire tensile strength to the cumulative tensile strength of the article formed.

The constructions formed by the practice of the instant invention are, therefore, particularly strong in tension and thus adapt themselves well to the fabrication of twines, for example, for use in baling and binding machines. The spacing and protection of each of the reinforcing strands further contributes to the strength and improved qualities of twines constructed by a process embodying the invention because of the greatly improved knot strengths of such twines as compared to their tensile strengths. Ratios of knot strengths to tensile strengths far in excess of those achieved in other reinforced sheet twines, for example, paper reinforced with glass fibers, are achieved in twines constructed by a process according to the practice of the instant invention.

In the drawings:

Fig. 1 is a greately enlarged view in perspective, generally diagrammatic in nature, illustrating the process of formation of such articles according to the instant invention, the relative sizes of the components of an article being out of scale and the relative width and lengths of the section of the article shown being similarly out of scale. The structure illustrated in Fig. 1 extends through the "fabricating dimension," i. e., that distance through which a strip is moved to complete its transformation from a flat strip of sheet material into a rolled article (in the case of Fig. 1—a reinforced twine) in accordance with the practice of the invention. In practice, this may be in the order of seven feet or more.

Fig. 2 is a still further enlarged fragmentary view and in perspective and showing the transverse cross section of a reinforced twine constructed according to the invention.

Fig. 3 is a fragmentary still further enlarged view of a portion of the article shown in Fig. 2.

Figs. 4, 5, 6, 7 and 8 are fragmentary sectional views on an enlarged scale taken respectively along the lines 4, 5, 6, 7 and 8 of Fig. 1 and illustrating the progression of formation of a reinforced resin, paper and glass fiber twine or similar article according to the invention.

Fig. 9 is a diagrammatic view in elevation of a machine on which the process of the invention may be carried out.

Fig. 10 is a fragmentary, diagrammatic, plan view of the structure shown in Fig. 9.

Figs. 11, 12 and 13 are detailed vertical sectional views of forming means employed in the apparatus of Figs. 9 and 10 for carrying out the process of the invention.

Fig. 14 is a diagrammatic view in perspective illustrating another form of structure by means of which the process of the invention may be carried out.

Fig. 15 is a detailed fragmentary vertical sectional view taken substantially on the line 15—15 of Fig. 14.

Fig. 16 is a fragmentary transverse sectional view on an enlarged scale of an article constructed according to the practice of the instant invention in which a centrally located core is wrapped with sheet material (in this case, reinforced) for protection, strengthening, or insulation, the structure shown being an exemplification only of a class of products in which central cores may be incorporated through the practice of the instant invention.

Fig. 17 is a schematic fragmentary plan view of auxiliary means which may be employed for carrying out a phase of the process constituting the instant invention where a central core is incorporated in the article as shown in Fig. 16.

Fig. 18 is a detailed vertical sectional view similar to Fig. 11 but illustrating a forming shoe for the fabrication of hollow elongated articles according to the process of the invention.

Fig. 19 is a view showing several stages in the fabrication of a modified form of article according to the invention.

The practice of the instant invention may be carried out for the fabrication of any or all of the articles specifically or generally disclosed both in the instant application and in related application Serial No. 246,685. For purposes of illustration in the instant application, however, the process will be described as it is employed to form glass fiber reinforced, resin bonded, baler or binder twines.

In carrying out the process of the instant invention a narrow strip of paper 10, for example, a kraft paper, or similar relatively tough, fibrous paper, is provided in a continuous source, for example, a large roll. The strip 10 is moved longitudinally at a constant rate of speed and during such movement there is applied thereto a thin layer of adhesive 11 that is spread over the entire upper surface of the strip 10. After the application of the adhesive 11 a plurality of spaced, parallel, reinforcing fibers or strands 12 are fed onto the adhesive coated surface of the strip 10. In this case of twine used as an illustration these reinforcing strands are each formed of a plurality of individual glass fibers (as can best be seen by reference to Fig. 3).

In the fabrication of a twine according to the invention, it will be noted that a relatively narrow margin 13 at the right edge of the strip 10 of the adhesive coated sheet material is kept free of reinforcing strands. A similar, though wider margin 14 may be left at the left edge of the strip 10. The placing of the reinforcing strands 12 on the adhesive coated surface of the strip 10 may be controlled in any of numerous manners well known in the art as, for example, by feeding the strands through a comb, the tines of which are appropriately spaced and located relative to the width and placement of the strip 10.

As the strip 10 progresses longitudinally its right edge 15 is bent upwardly and laid over the closest one or more of the reinforcing strands 12 (see Figs. 4 and 5). The lapped margin 13 of the edge 15 thus forms what might be termed a rolling core about which the strip progressively will be rolled up as it moves through the "fabricating dimension."

A comparison between Figs. 4, 5, 6 and 7 shows how the strip 10, adhesive 11 and reinforcing strands 12 are rolled into a spiral cross section as the strip 10 progresses through the fabricating process. When the strip 10 approaches the right end of the "fabricating dimension" (Fig. 1) or the position indicated by the section line 8—8 and shown in section in Fig. 8, it has been rolled upon itself enough times so that when an unreinforced margin 14 is provided, it is lapped around the exterior of the article in an extra protective layer. It will be observed in Fig. 8 that a left edge 16 of the margin 14 of the strip 10 is located one turn beyond the outermost layer of reinforcing fibers 12. The margin 14 extends in a full spiral layer from that point to the beginning of the reinforcing fibers.

In many articles, particularly those not subject to the scuffing or other abrasion to which a twine is exposed, it may not be necessary to provide the extra protective layer of sheet material formed from the margin 14. In such cases, the strands 12 may extend almost to the left edge 16 and the outermost layer of the strip 10 is relied upon as a protective skin or surface.

The process of fabrication briefly described above results in the left edge 16 of the strip 10 being moved along in a straight line and the balance of the strip being rolled progressively transversely across the strip as it is moved longitudinally. As a result, therefore, in the finished twine the left margin 16 extends along a straight line parallel to the axis of the finished twine. The right edge 15, by reason of its being rolled to form the twine, is spiralled one turn for each of the layers in the finished helix, for the "fabricating dimension." Progressively outward from the center, each layer of the strip 10 and reinforcing fibers 12 are spiralled one less turn per "fabricating dimension" until finally the exteriormost layer of the strip 10 is not spiralled at all, i. e., the edge 16 lies along a straight line. In actual practice, the flexibility of the materials, however, may introduce a slight twist even in the exterior layer in the order of about one turn per "fabricating dimension." The reinforcing strands of fibers 12 similarly are spiralled progressively greater numbers of turns from the outside of the twine to the inside but, compensatingly, lesser numbers of strands are spiralled through the greater number of turns and also the layers of strands in the interior of the twine are nearer the neutral axis of the twine so that even though the spiral lessens the effective application of the tensile strengths of the reinforcing strands as the reinforcing strands are spiralled through greater numbers of turns per dimension, there are few of the strands spiralled many times and the effect at the neutral axis is virtually eliminated.

Because the reinforcing strands are laid on the strip 10 when the strip is flat and adhered thereto by the adhesive 11, they can be and are spaced from each other and distributed over the surface of the strip 10 in any desired manner. The adhesive selected to be employed must be one which will firmly grasp both the strip 10 and the reinforcing strands 12 and should be one which is (at least during processing) sufficiently soft so that as the strip 10 is rolled the adhesive will fill in between the reinforcing strands 12 in the intervening spaces between the layers of sheet material in the strip 10. The adhesive should also be one of the many types which retain flexibility after they are set up and thus the twine itself will not be too stiff to be handled in conventional twine handling machines. Adhesives of the synthetic resinous types generally are effective for this use.

Figs. 9 through 13 diagrammatically illustrate a "bread board" device set up to practice the process of the instant invention. In this device a general frame is provided by a flat panel 17 having a curved upper edge 18 on which are mounted a plurality of carrying rollers 19 and forming shoes 20. The rollers 19 rotate on axes generally parallel to the plane of the strip 10 but skewed slightly relative to a line perpendicular to the length of the strip 10 (see Fig. 10). The forming shoes 20, 21 and 22 (shown in enlarged cross section in Figs. 11, 12 and 13) progressively are modified in their shape in order to fold the margin 13 of the strip 10 over the first one or two of the reinforcing strands 12 and then to roll the strip 10 transversely across itself as the strip progresses over the rollers 19 and through the shoes 20 which, as is seen in Fig. 10, may extend a substantial distance from the first shoe 20 illustrated in Fig. 11 and through the intermediate shoes 21 and 22 of Figs. 12 and 13 and to the final shoe 23 at the right side of Fig. 10.

Reinforcing strands 12 are supplied from a plurality of supply spools 24 (see Fig. 9) located at the left side of the machine illustrated in Figs. 9–13. The strands 12 are led over an idler roller 25 through a spacing comb and beneath an idler roller 27. A roll 28 of the sheet material forming the strip 10 is provided at the left side of the machine. The strip 10 is led around an idler roller 29 and past an adhesive brush 30 which spreads the layer of adhesive 11 on the surface of the strip 10 and then over a joining roller 31 where the reinforcing strands 12 are laid on the strip 10. The adhesive coated strip 10 with its reinforcing fibrous strands 12 is then led up and over the first of the rollers 19 and through the first forming shoe 20.

The convex edge 18 of the panel 17 and the corresponding arcuate relationship between the rollers 19 and shoes 21 in general is designed to maintain tension on the strip 10 and the reinforcing strands 12 during their passage through the entire "fabricating dimension." It is for this reason that the idler rollers 27 and 29 are located at a level beneath that of the first of the idler rollers 19. Although the mechanism is shown as vertically erected in Fig. 9, it might, of course, be horizontal and in such instance the relationships between the supply and forming members of the apparatus would be maintained in order to keep tension on the strip 10 during formation.

The skew of the axes of the rollers 19 is adjustable in order to control the resulting lateral force tending to push the strip 10 into the forming shoes 21, rolling up the strip 10.

At the right side of the apparatus shown in Fig. 9 there is provided a motor driven wind up spool 32 and a traverser 33 for laying the finished twine on the spool 32 in helical layers. This structure is conventional in the twine forming art and is merely generally disclosed.

The particular apparatus shown in Figs. 9–13 for carrying out the process of this invention is more particularly disclosed and claimed in concurrently filed related application Serial No. 246,687 of Games Slayter and Ed Fletcher and is disclosed herein as merely one of several apparatuses on which the process of the instant invention can be carried out.

Another apparatus in which the process of the invention can be carried out is illustrated in Figs. 14 and 15. This apparatus comprises a main longitudinally travelling belt 34 which moves in a direction parallel to the left edge 16 of the strip 10 and extends through the "fabricating dimension." The strip 10 with or without its reinforcing fibers 12 is fed onto the end of the belt 34 and beneath the first edge of an oblique rolling apron 35 which extends across and moves transversely across the strip 10 so that the combined longitudinal movement of the strip and angular movement of the apron 35 results in rolling the strip 10 transversely across itself. A second apron 36 and additional rolling aprons may also be provided to progressively roll the strip 10 forming the twine as it is moved along the belt 34.

The aprons 35 and 36 and similar aprons should be slightly inclined with respect to the surface of the belt 34 as is illustrated in Fig. 15 in order to avoid crumbling the twine being rolled and also should be inclined slightly upwardly along the path of movement of the belt 34 to accommodate the increasing dimension of the twine as it is rolled.

In the description and explanation of the process above set forth the steps in the process and description of the two apparatuses disclosed for carrying it out have been restricted to the fabrication of a twine from paper as a sheet material, resinous adhesives as a binder and glass fiber strands as a reinforcing material. It can readily be seen that in the event reinforcing strands are not desired in the finished article, a sheet of any kind of flexible material can be rolled into a solid cross sectioned article. Although paper is illustrated, resinous sheet material similarly can be rolled and in such event the adhesive may not even be needed because the resin can be self-adhered by heat treatment.

Although in the illustrations so far described the article is shown as having a solid cross section, as is disclosed in the related application of Slayter Serial No. 246,685 articles also may be constructed through the practice of the instant invention which are hollow and thus exist in the form of thin walled tubing. The change in the process necessary to carry out such a fabrication is merely that the initial forming shoe carries the right edge 15 of the strip 10 around a mandrel and instead of lapping the margin 13 downwardly upon itself folds it over sufficiently so that it leaves a central space of the size determined by the mandrel. Fig. 18 is a cross sectional view of an initial forming shoe (similar to that illustrated in Fig. 11) in which this fabricating step takes place. A forming shoe 37 is turned upwardly and over at its right edge 38 so that the edge 15 of the strip 10 is brought around a generally circular mandrel 39 correctly spaced in the loop of the shoe 37.

Similarly, as is disclosed in the companion application of Slayter Ser. No. 246,685, articles may be fabricated according to the process of the instant invention which have central cores for the purpose of reinforcing the finished article, or with a reversal of emphasis, the central core may be the heart of the article and the sheet material wrapped thereabout for reinforcing or protection of one kind or another.

Such an article is illustrated in Fig. 16 where a central twisted electrical conductor 40 is shown as having an insulating material comprising a resinous sheet 41 in which are embedded reinforcing strands or fibers 42.

Similarly the disclosure of Fig. 16 might indicate a raffia, or rod, or shaft in which the central core-like element 40 might be made of a plurality of stiff, tough fibers, for that matter strands of glass fibers, and the sheet 41 and reinforcing fibers 42 might be resinous material or paper and glass fibers adhered together by an adhesive.

Indeed, the structure illustrated in Fig. 16 might be a tougher, stronger, baler or binder twine having the same utility as the baler and binder twine shown as being fabricated in Figs. 1 through 15. In this case the central element 40 might be a plurality of strands of glass fibers. The sheet material 41 would be kraft paper of similar material and the reinforcements 42 might be individual glass fiber strands.

In any event, and regardless of the particular article being fabricated of the generic class illustrated in Fig. 16, an additional step in the process is provided in order to give a "false twist" to the central core element, viz., the conductor 40.

As has been earlier explained, the right edge 15 of the strip 10 (in Fig. 16 a right edge 43 of the strip of material 41) is rolled over one time for each layer of the finished helix of strip during the passage of the article being formed through the "fabricating dimension." Thus, if the central core element 40 were adhered to the right edge 43 it, too, would be spiralled a similar number of turns. This would tend to reduce the effective application of its tensile strength in those articles where its tensile strength is designed to be employed. It would also introduce objectionable twist into an article where the central core is merely being protected or coated as, for example, in the case of an electric conductor.

In order to precondition, as it were, the central core element 40 so that after being twisted during the rolling formation of the article, it will finish up without any twist, it is given a so-called "false twist." The structure illustrated in Fig. 17 is conventional for giving a "false twist" to a longitudinally moving element and consists in a belt 44 and twisting apron 45 that act upon the core element 40 before it is laid upon a strip, in this case of the sheet material 41. As can be seen in Fig. 17 the core element 40 engages the belt 44 at one side and is rolled over as it progresses on the belt 44 by the apron 45 introducing thereinto a "false twist" and moving the core element 40 over and in line with the edge of the strip of sheet material 41. By properly controlling the relative speeds of the belt 44 and apron 45 with respect to the linear speed of the core 40 and strip of material 41, an appropriate number of turns of "false twist" are put into the core element 40 before it engages with the strip of sheet material 41 so that upon being twisted in the opposite direction during the progressive formation of the article according to the process of the invention, the "false twist" will be removed and the core element 40 will be untwisted in the finished product.

As in the case of other embodiments of the invention a left or outside edge 46 of a structure having a core and constructed as shown in Fig. 16 by the practice of the invention, lies along a straight line parallel to the axis of the article.

In many embodiments of the invention disclosed and claimed in the related application of Games Slayter Serial No. 246,685, which may be fabricated according to the invention disclosed herein, it is desirable to "bulk up" or increase the diameters of the articles without increasing the numbers of reinforcing strands where such strands are employed. For example, in the fabrication of baler and binder twines (which in general has been discussed above) a construction such as that disclosed in Figs. 1–8 may result in a twine having sufficient tensile strength for the purpose for which it is to be employed but having a diameter less than the diameter of a correspondingly strong twine fabricated from more conventional materials such as sisal and hemp fibers. Where the twine is to be employed in a machine having mechanical knot tying equipment, the lesser diameter of a twine constructed according to the process of the invention may interfere with the perfect operation of the machine. If a twine constructed according to the invention as shown in Figs. 1 through 8 is merely made to a larger diameter, the tensile strength of the resulting twine will be unnecessarily great.

Fig. 19 illustrates a modification of the type of article fabricated by the process of the invention in which additional bulking layers of sheet material are interposed between the successive layers of reinforcing strands. In the article shown in Fig. 19 a sheet of material 47 is coated approximately half way across its width with a layer of adhesive 48 in which are adhered a plurality of reinforcing strands 49. A margin 50 is left along one edge of the sheet 47 and the uncoated half of the sheet 47 folded transversely over and upon the reinforcing strands 49 with the edge opposite the margin 50 being adhered thereto to close the "envelope" or double ribbon of sheet material 47 on both sides of the strands 49. The double paper layer structure comprising the folded over sheet 47 is then progressively moved through the manufacturing process embodying the invention as herein described and its doubled over edge 51 curled up and over to form a first loop 52 which is adhered in place by a coating of adhesive 53 previously spread upon the upper surface of the double ribbon. As the structure progresses through the manufacturing process it is rolled upon itself in a manner identical to that already described with respect to the single layer structures disclosed in the other figures, until a rolled, bulked-up twine 54 is formed.

By thus bulking up the twine it is possible to produce a twine having not only a tensile strength substantially equal to that of a conventional sisal twine, for example, but also having substantially the same diameter. Such a bulked-up baler twine is easily handled in automatic knot tying equipment many hundreds of which machines are already employed in the baling and binding industries.

Additionally, by interposing double layers of sheet material 47 between each resin or adhesive bonded layer of strands 48 in the finished twine 54, the strands 48 are further protected from each other and held more firmly in position to prevent their self-abrasion.

Although, in the description of the process above set forth, it has been explained that the reinforcing strands 12, for example, (Figs. 4–8) are laid upon the adhesive 11 freshly spread on the strip 10, it may be desirable in some circumstances for the reinforcing strands 12 to be positioned upon the tape 10 and fixed in position thereon by the adhesive 11 at sometime prior to the actual rolling process constituting the invention. The reason for this pre-construction of a reinforced tape prefatory to practicing the process of the invention, is to insure that the strands 12 are firmly positioned and will not slide or move with respect to the strip 10 during the forming process. In handling certain types of sheet material of very low tensile strength it is additionally advantageous (when the reinforcing strands are employed) if the strands are securely adhered to the sheet material prior to the rolling process. When this condition is established, the tension applied to the composite tape during the process of the invention need not be resisted entirely by the strip 10 but also is resisted by the strands 12 adhered to the strip 10.

Other apparatuses may be conceived for carrying out the process of the instant invention and the process is capable of practice for the continuous production of any rolled elongated articles in accordance with the teachings of this application for the fabrication of the articles disclosed in the related application of Games Slayter, Serial No. 246,685.

Having described the invention, we claim:

1. A process for the fabrication of a strand, cord, rod or the like, that comprises moving a narrow strip of sheet material longitudinally and simultaneously progressively rolling said strip on itself transversely to its direction of movement.

2. A process for the fabrication of a strand, cord, rod or the like, that comprises moving a narrow strip of sheet material capable of being adhered to itself longitudinally and simultaneously progressively rolling said strip on itself transversely to its direction of movement.

3. A process for the fabrication of a strand, cord, rod or the like that comprises moving a narrow strip of sheet material longitudinally and simultaneously progressively rolling said strip on itself transversely to its direction of movement to form a generally helical cross section.

4. A process for the fabrication of a strand, cord, rod or the like that comprises moving a narrow strip of sheet material longitudinally and simultaneously progressively rolling said strip on itself transversely to its direction of movement to form a generally helical cross section and adhering successive layers of said sheet material to each other.

5. A process for the fabrication of a strand, cord, rod or the like, that comprises moving a narrow strip of sheet material capable of being adhered to itself longitudinally, simultaneously turning one edge thereof inwardly upon itself and progressively rolling said sheet thereupon laterally to its direction of movement, maintaining the other edge of said sheet substantially straight and adhering successive rolled layers of said material together.

6. A process for the fabrication of a strand, cord, rod or the like of high tensile strength that comprises moving a longitudinally reinforced narrow strip of sheet material capable of being adhered to itself longitudinally, simultaneously turning one edge thereof inwardly upon itself and progressively rolling said sheet thereupon laterally to its direction of movement, maintaining the other edge of said sheet substantially straight, and adhering successive rolled layers of said material together.

7. A process for the fabrication of a strand, cord, rod or the like of high tensile strength that comprises moving a longitudinally reinforced, adhesive coated, narrow strip of sheet material longitudinally, simultaneously turning one edge thereof inwardly upon the coated surface thereof and progressively rolling said sheet thereupon laterally to its direction of movement, maintaining the other edge of said sheet substantially straight, and adhering successive rolled layers of said material together.

8. A process for the fabrication of a strand, cord, rod or the like, that comprises moving a narrow strip of sheet material capable of being adhered to itself longitudinally, progressively rolling one edge of said strip laterally to its direction of movement and over upon the strip and continuing such rolling and movement until said strip is rolled into a generally helical cross section having an axis generally parallel to the other edge of said strip.

9. A process for the fabrication of a strand, cord, rod or the like, that comprises moving a narrow strip of sheet material longitudinally and simultaneously applying force transverse to its direction of movement to one edge of said strip only for rolling said edge over upon said strip.

10. A process for the fabrication of a strand, cord, rod or the like, that comprises moving a narrow strip of sheet material capable of being adhered to itself longitudinally and simultaneously progressively rolling said strip on itself transversely to its direction of movement, discontinuing such rolling when said strip is in the form of a helix in cross section and continuing such longitudinal movement.

11. A process for the fabrication of a strand, cord, rod or the like, that comprises moving a narrow strip of sheet material capable of being adhered to itself longitudinally, applying generally longitudinally extending reinforcing material to one surface of said strip, progressively turning one edge of said strip over upon such material and progressively rolling said sheet thereupon laterally to its direction of movement.

12. A process for the fabrication of a strand, cord, rod or the like, that comprises moving a narrow strip of sheet material capable of being adhered to itself longitudinally, applying generally longitudinally extending reinforcing material to one surface of said strip, progressively turning one edge of said strip over upon such material and progressively rolling said sheet thereupon laterally to its direction of movement, maintaining the other edge of said sheet substantially straight and adhering successive rolled layers of said material together.

13. A process for the fabrication of a strand, cord, rod or the like of high tensile strength that comprises moving a narrow strip of sheet material longitudinally, applying a plurality of generally parallel, reinforcing strands to one surface of said strip, progressively turning one edge of said strip over upon said strands, progressively rolling said sheet thereupon laterally to its direction of movement and maintaining the other edge of said sheet substantially straight.

14. A process for the fabrication of a strand, cord, rod or the like that comprises longitudinally moving a narrow strip of sheet material, applying an adhesive coating to one surface thereof, progressively turning one edge of said strip over upon the coated surface thereof, progressively rolling said sheet thereupon laterally to its direction of movement and maintaining the other edge of said sheet substantially straight and generally parallel to the axis of the article being formed.

15. A process for the fabrication of a strand, cord, rod or the like, that comprises longitudinally moving a narrow strip of paper, adhering continuous longitudinally extending glass fiber strands to one surface thereof, progressively turning only one edge of said strip laterally over upon said strands, and progressively rolling said strip thereupon laterally to its direction of movement while continuing the longitudinal movement of said strip until said strip is rolled into an article having a generally helical cross section.

16. A process for the application of a continuous exterior layer to a continuous cord, strand, wire, tube, rod or the like, that comprises, longitudinally moving a narrow strip of material constituting such layer and having at least one surface capable of being adhered, feeding the continuous cord or the like to be coated continuously onto said strip near one edge thereof and at the same linear speed as said strip is moved, rolling said strip laterally to its direction of movement over and around such object progressively, and continuing such lateral rolling until the other edge of said strip is adhered to the exterior of the rolled strip while continuing such longitudinal movement during such rolling.

17. A process for the fabrication of a continuous elongated mass of material having a generally annular cross section that comprises, longitudinally moving a narrow thin strip of such material, progressively rolling one edge of said material laterally to its direction of movement and over against the surface of said strip forming an inner spiral turn of said material with a generally cylindrical space enclosed thereby, continuing both said longitudinal movement and said rolling until the other edge of said strip is adhered to the exterior of such mass of material and then continuing only the longitudinal movement of said mass of material.

GAMES SLAYTER.
ED FLETCHER.

References Cited in the file of this patent

UNITED STATES PATENTS

| Number | Name | Date |
| --- | --- | --- |
| 2,108,981 | Creamer | Feb. 22, 1938 |
| 2,135,880 | Waldman et al. | Nov. 8, 1938 |
| 2,553,757 | Evans | May 22, 1951 |
| 2,577,843 | Crosby et al. | Dec. 11, 1951 |
| 2,614,054 | Baisch et al. | Oct. 14, 1952 |

FOREIGN PATENTS

| Number | Country | Date |
| --- | --- | --- |
| 449,223 | Great Britain | June 23, 1936 |